3,669,780
METHOD FOR REMOTELY SEALING PLASTICS USING ULTRASONIC ENERGY
Howard Deans, Secane, and Thomas B. Sager, Plymouth Valley, Pa., assignors to Ultrasonic Systems, Inc., Farmingdale, N.Y.
Continuation-in-part of application Ser. No. 540,335, Apr. 5, 1966. This application Aug. 1, 1969, Ser. No. 866,047
Int. Cl. B29c 27/08; B32b 31/16
U.S. Cl. 156—73                                         7 Claims

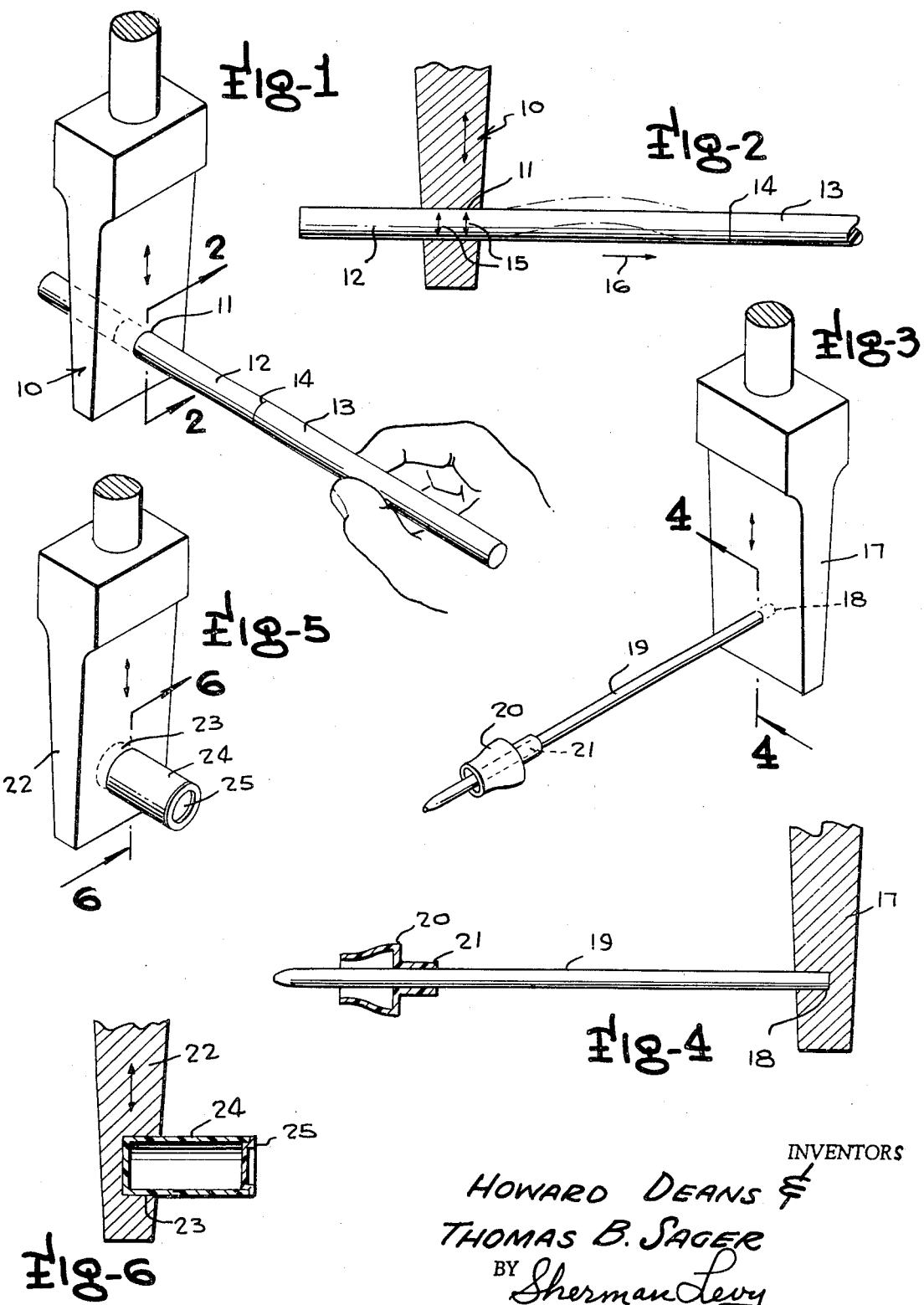

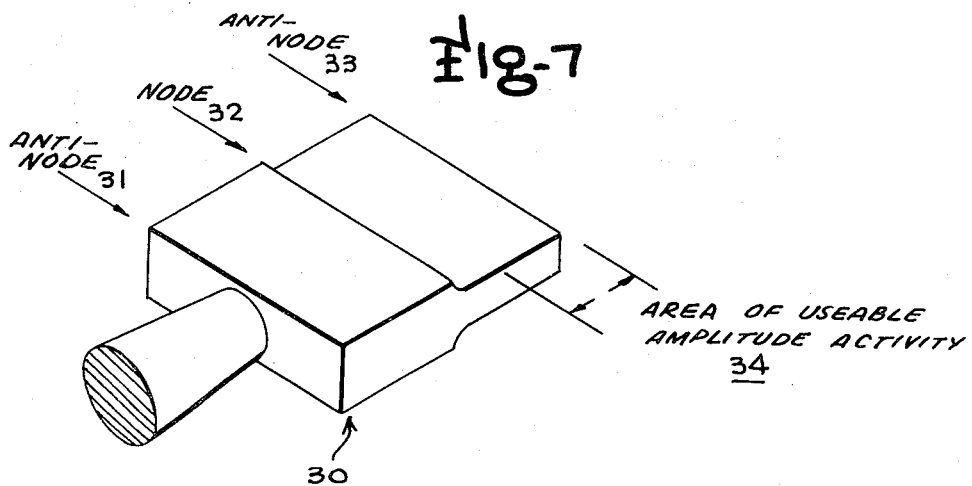
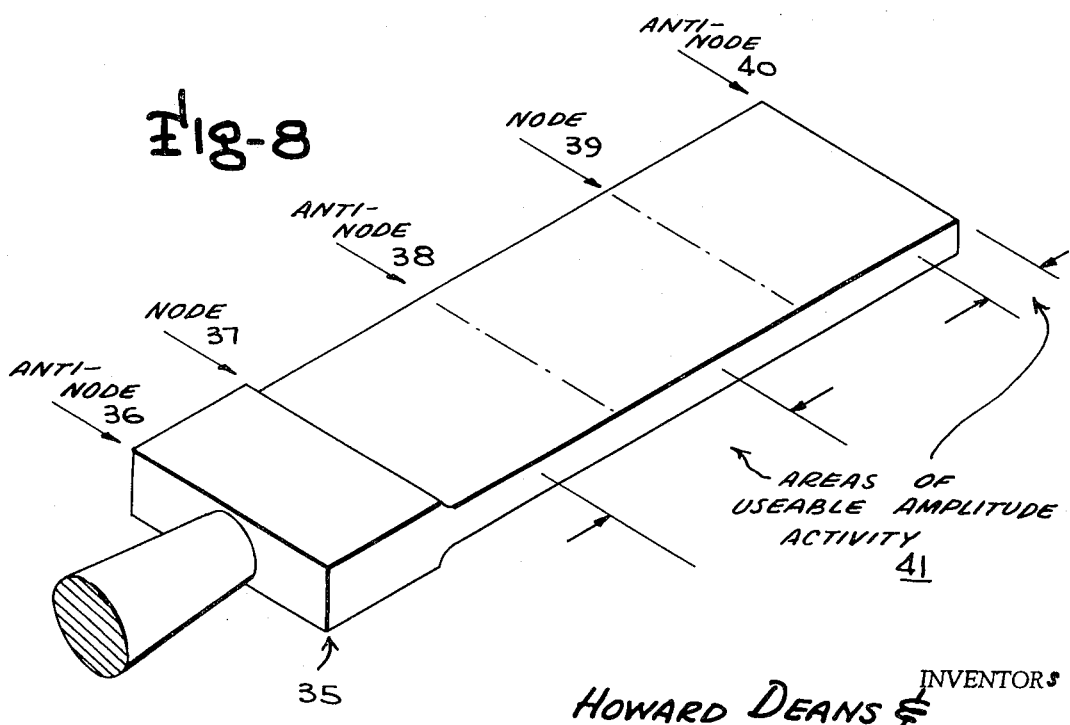

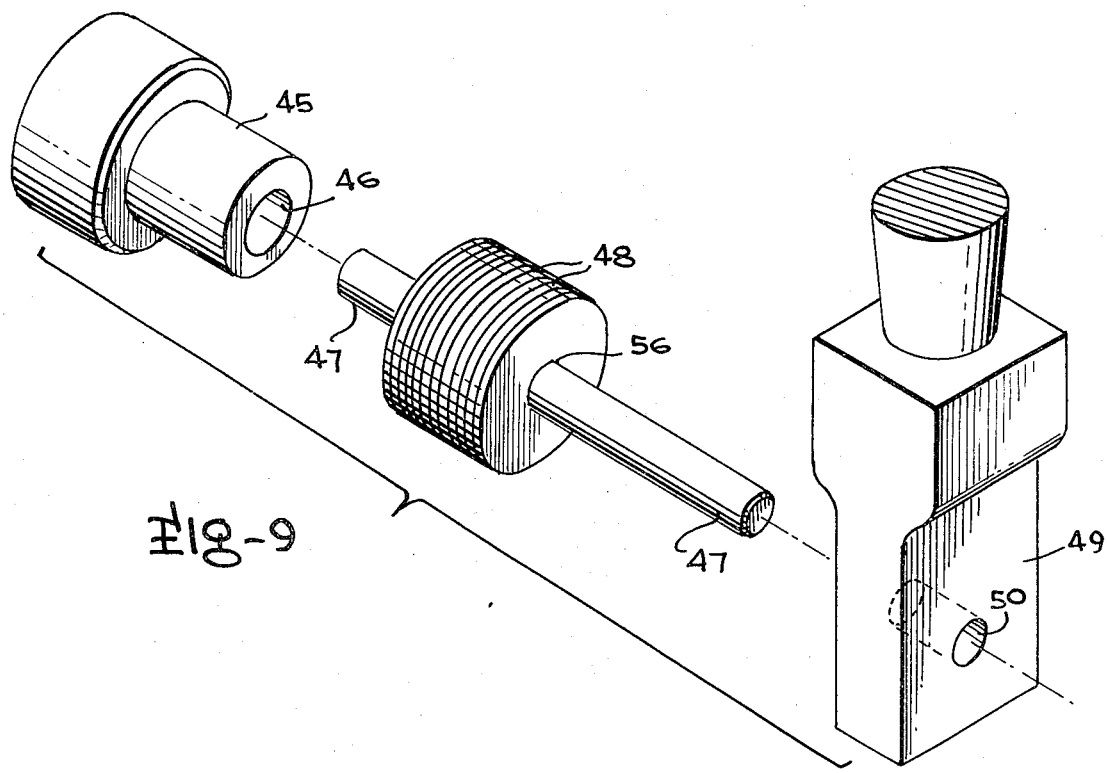
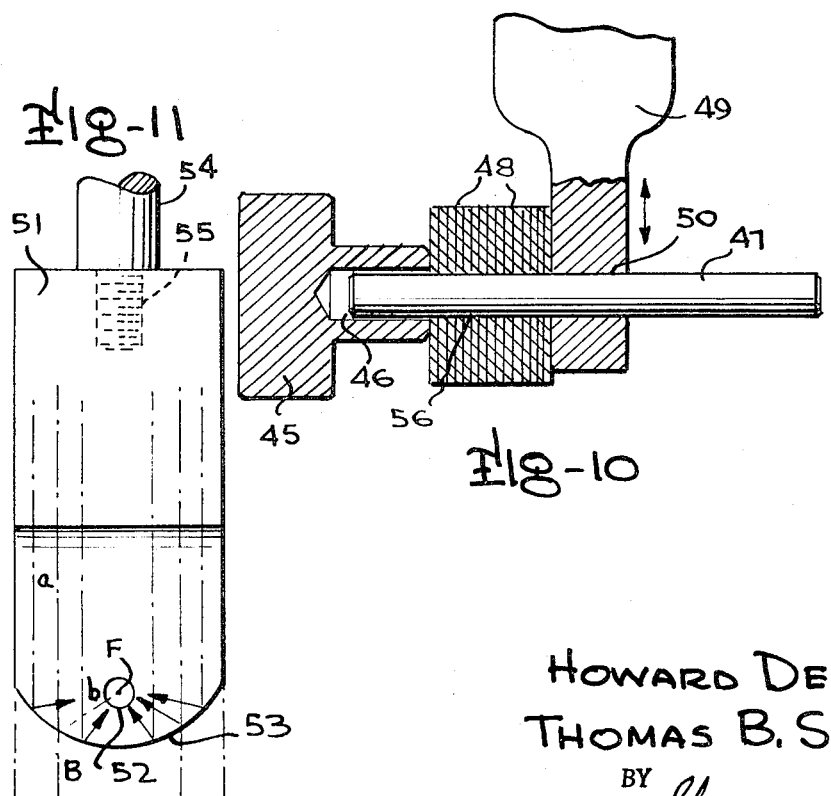
INVENTORS
HOWARD DEANS &
THOMAS B. SAGER
BY Sherman Levy
ATTORNEY United States Patent Office 3,669,780
Patented June 13, 1972

ABSTRACT OF THE DISCLOSURE

A method and means for remotely sealing plastics wherein an undriven member of two members is clamped or held in relation to a member being ultrasonically energized, and whereby fusion of plastic joints takes place, the tool not being in contact with the joints.

CROSS REFERENCE TO RELATED APPLICATION

This application is a continuation-in-part of application Ser. No. 540,335, now abandoned, filed Apr. 5, 1966.

This continuation in part of application Ser. No. 540,335 relates to ultrasonic sealing and more particularly to a method of and means for remotely sealing thermoplastics.

An object of the present invention is to provide a method of and means for remotely sealing thermoplastic materials, wherein at least one of several members is contained or clamped within the tool, and wherein said member is moved and vibrated perpendicular to the main axis thereof.

Still another object of the present invention is to provide a method of remotely sealing plastic materials wherein, for example, long cylindrical thermoplastic items can be sealed with improved efficiency, and wherein according to the present invention there is set up shear waves in one of the parts to be bonded, and wherein the present invention is adapted to have various applications, such as butt sealing of rigid and semirigid plastic tubing and sealing plastic rods and tubes to larger members, as well as permitting sealing of caps on ends of tubes and the like.

Still another object is to provide a method and means for accomplishing ultrasonic sealing wherein the undriven member of the two being welded is held or clamped in relation to the member being ultrasonically energized. Also, remote sealing is used to bring about fusion of plastic joints wherein the tool is not in intimate contact with that joint. The plastic itself is utilized to conduct the ultrasonic energy to that joint.

Also, in accordance with the present invention, kinetic energy (ultrasonic range) can be used to relieve stress between the metal discs and the shaft which may be set up when the metal discs are pressed side by side onto the shaft and wherein an ultrasonic horn with the hole located in the side using shear methods can be utilized to achieve the release of the stress.

In addition, a focusing type of ultrasonic horn can be used which has a hole that is used for bonding plastic materials.

A still further object is to provide a method and means for ultrasonic sealing wherein a focusing type of ultrasonic horn can be used for bonding plastic materials.

Still another object is to provide a method that is economical to carry out and efficient in operation.

Further objects and advantages are to provide elements and arrangements thereof in a device and method of the character described that is economical to produce, durable in form, and conducive to the most economical use of materials and uniformity of members formed therefrom.

Still further objects and advantages will become apparent in the subsequent description in the specification.

In the drawings:

FIG. 1 is a perspective view illustrating one application of the present invention and showing butt sealing of rods or tubes.

FIG. 2 is a sectional view taken on the line 2—2 of FIG. 1.

FIG. 3 is a fragmentary perspective view of a modification illustrating internal sealing.

FIG. 4 is a sectional view taken on the line 4—4 of FIG. 3.

FIG. 5 is a perspective view of a further modification.

FIG. 6 is a sectional view taken on the line 6—6 of FIG. 5.

FIG. 7 illustrates in perspective a half-wave length tool.

FIG. 8 illustrates a full wave length tool.

FIG. 9 is a perspective view illustrating a further modification.

FIG. 10 is a fragmentary sectional view illustrating the modification of FIG. 9.

FIG. 11 is an elevational view illustrating a focusing type of ultrasonic horn with a hole that is used for bonding plastic materials.

Referring in detail to the drawings, and more particularly to FIGS. 1 and 2 of the drawings, the numeral 10 indicates an ultrasonic tool which may have an opening 11 therein and the opening 11 may extend all the way through the tool, and the numeral 12 indicates a rod or tube which is adapted to extend through the opening 11. The numeral 13 indicates a rod or tube which is adapted to be sealed to the member 12 as at 14. In FIG. 2 the arrows 15 may indicate particle motion while the arrow indicated by the numeral 16 may indicate wave direction.

Attention is now directed to FIGS. 3 and 4 of the drawings, wherein the numeral 17 indicates a portion of a conventional ultrasonic tool which has a recess or cavity 18 therein, and the numeral 19 indicates a rod or member which has an end portion thereof seated in the recess 18. An article or member 20 is adapted to be internally sealed as at 21 onto the member 19.

Referring now to FIGS. 5 and 6 of the drawings, there is illustrated a still further modification, wherein the numeral 22 indicates an ultrasonic tool which has a recess 23 therein, and the numeral 24 indicates a member or part which is adapted to have an end portion thereof seated in the recess 23 and a cap or closure 25 may be ultrasonically sealed onto the tube or member 24.

From the foregoing, it will be seen that there has been provided a method of and means for remotely sealing thermoplastic material within the tool, and according to the present invention one or two members are contained or clamped within the tool so as to be effectively bonded and vibrated perpendicular to its main axis.

With further reference to the arrangement shown in FIGS. 1 and 2 there is illustrated one application of the present invention wherein butt sealing of members, such as rods or tubes 12 and 13, is accomplished, and the sealing takes place at the juncture indicated by the numeral 14. In this arrangement the ultrasonic tool 10 is provided with an opening 11 all the way through which extends a portion of member 12.

With further reference to the present invention, it is to be noted that in sealing long slender thermoplastic items, the new method of applying the energy to the article greatly increases the efficiency of the sealing. For example, this permits the bonding of delicate parts where there has been no way in the past of coupling the energy into such parts without marring or destroying or damaging such parts.

In accordance with the present invention, the method consists of setting up shear waves on one of the two parts, such as the rod 12 or the part 19 or the part 24, and shear waves are generated by applying a shear force to the face of the material, i.e., working it back and forth in a direction perpendicular to the surface. In FIG. 2 the numeral 16 may indicate perpendicular wave direction. This shear wave is applied to the part by machining or forming a close fitting hole or cavity, such as the recess or cavity 11 or the recess or cavity 18 or the recess or cavity 23 in the side or other portion of the longitudinally vibrating ultrasonic tool and placing a part such as the part 12 in this cavity. The amount of protrusion from the tool, such as the tool 10, may be somewhat critical depending upon the amount of transmission and absorption of sonic energy in the particular plastic being used. If desired, in order to provide the proper protrusion, the hole can be extended entirely through the tool, and such a hole is shown in FIG. 2.

It is noted that if the hole is placed in the end of the tool and the part inserted therein, the same effect will not take place or be accomplished, and further the inertia of the plastic part will not permit it to follow the vibration of the tool, and it will slip in the hole. The mode of vibration also is not as efficient for such shaped parts or articles.

The following is given as some of the applications of the present invention. However, it is to be understood that the present invention is not limited to such applications, and these applications are merely exemplary.

As in FIGS. 1 and 2, butt sealing of rigid and semi-rigid plastic tubing can be accomplished. Also, as shown in FIGS. 3 and 4, plastic rods and tubes can be fastened to larger members either by butt sealing or internal sealing. Also, as shown in FIGS. 5 and 6, ends 25 may be capped onto small vials, such as the vials 24.

With the present invention there is no limit to the shape of the part as long as it fits into a close fitting cavity in the tool. In addition, the cross section or diameter thereof is limited to that which can be located in a high amplitude area of the tool. For example, in most ultrasonic tools the distance of ¼ wave length, i.e., the distance from full amplitude to a node, is approximate 2½ inches, and hence the limit of diameter of the part size may be 1 inch or under, for 20 kc. Also lower frequencies will allow larger parameter tools and thus larger parts can be bonded or sealed. In addition, full wave areas can be utilized, and these examples are merely illustrative and are not to be considered in a limited sense.

The present invention may be used for various purposes in addition to those already described, such as capping bottles, bonding vials and the like.

With further reference to the present invention as compared to prior art devices and inventions, the present invention differs basically from the prior art conventional devices. The conventional method uses compressional forces applied to the end of cylindrical or long axis parts such as are being welded, and this produces localized heat and surface fusion at the tool contact point in most cases. The welding of thin wall tubing or other parts cannot be accomplished because the pressure required to couple energy into the parts will collapse it. The hermetic seals cannot be readily made and the results are spotty. All of these drawbacks are overcome with the present invention.

Also, it is to be noted that a full wave length tool can be utilized instead of the conventional half wave length configuration. This offers an advantage in that some of the limitations mentioned previously can be broadened. The use of such a tool increases the size of the tube or part which can be bonded because the anti-node or area of maximum amplitude is doubled. FIGS. 7 and 8 show the tool in a horizontal plane and thus illustrate an attitude different from that of a conventional sealer and, in addition, in actual use this permits a more practical arrangement in that the part to be sealed can be inserted into the cavity in the tool and the mating part can be brought down on top of the upright piece. Also, in FIG. 7 the numeral 30 indicates a portion of a half wave length tool and the numerals 31 and 33 indicate anti-nodes while the numeral 32 indicates the node and the numeral 34 indicates the area of useable amplitude activity.

Also, in FIG. 8 there is generally shown a full length wave tool indicated by the numeral 35, and the numerals 36, 38 and 40 indicate anti-nodes while the numeral 37 and 39 indicate nodes and the numeral 41 indicates the areas of useable amplitude activity for this particular arrangement.

Attention is now directed to FIGS. 9 and 10 of the drawings wherein there is illustrated a modification and wherein the numeral 45 indicates a fixture that is adapted to be used for bringing bearing force against discs such as the discs 48. The fixture 45 may be provided with an opening 46 for receiving therein a shaft 47 that has the discs 48 thereon. The numeral 49 indicates an ultrasonic horn having a hole or opening 50 located in a side thereof.

Attention is now directed to FIG. 11 of the drawings wherein the numeral 51 indicates a focusing type of ultrasonic horn with a hole 52 therein. The working end 53 of the tool 51 is parabolic in shape and is curved so that the parallel compressional waves emitting from the transducer 54 are focused onto the hole 52 where the plastic processing takes place. The tool length and shape are such that the compressional wave $a$ plus its reflected element $b$ becomes a half wave length at the focal point F. The numeral 55 indicates a screw stud connection between the transducer 54 and the tool 51. The reflection takes place at the end of the tool as the energy in the tool medium reaches this boundary and is turned back into the medium in which it originated. If this reflection did not occur, it would normally proceed along B, and the equivalent half wave length of such a tool would be of a longer dimension. In any event, $b$ equals B if the tool media are identical. With such a tool, much higher acoustical density can be obtained in the plastic processing area than a conventional tool having a hole. Materials have good sonic properties, of which such a tool can be made, are aluminum, titanium, Monel and Al-Bronze.

As specific examples of thermal plastic materials that are applicable to the hole-in-the-tool of the present invention are as follows: Polystyrene, polycarbonate, acetal, nylon, rigid PVC, and the like. Generally speaking, any rigid or semirigid thermal plastic or similar material having good sonic transmittal property can be used.

With reference to FIGS. 9 and 10, there is illustrated the use of kinetic energy (ultrasonic range) to relieve stress between the metal discs such as the discs 48 and the shaft 47 which is set up when the metal discs are pressed side by side onto the shaft and, during that mechanical press fit, caused slight misalignment through the metal discs' holes 56 where the shaft 47 passes therethrough. This stress has a tendency to cause the shaft 47 to bow and thus prevents its use in various applications such as an armature in an electric motor. The ultrasonic horn with the hole 50 located in the side (using shear methods) can be used to relieve the stress and to accomplish the aforementioned objectives.

Thus, as a specific example, FIGS. 9 and 10 illustrate the use of ultrasonic vibrations for installing shafts such as the shaft 47 into discs or laminations 48. It has been found that when a shaft such as the shaft 47 is pressed into the laminations it takes a permanent set into a curved arch, and this creates runout on either end of the shaft that is detrimental to the operation. It has been found that this curve is caused by internal stresses on the shaft by the laminations and can be relieved by tapping gently on the plates or rotating the shaft while bending it slightly to cause the plates to move relative to one another. Apparently it is the inter-laminar surface friction between the plates that holds the shaft in such a crooked position. According to the process and apparatus of the present invention such stresses can be relieved as the shaft is being pressed into the plate. It is to be noted that the shafts are hardened and centerless ground and are very straight, and in this particular application it is necessary to maintain the straightness after assembly, and it can be regained by the stress relieving method. The shafts as received have a TIR of approximately .0001" after they are pressed into the plates it increases to .0007" or more. This is measured over the outer 3/8" of either end of the shaft.

Attention is directed to applicants' co-pending patent application Ser. No. 810,692 on an Automatic Ball Point Barrel to Cap Sealer for a further discussion of certain aspects of this invention.

With the present invention the tool is remote from the sealed area. It is to be noted that there is a difference between metal welding and plastic welding since these are two entirely different concepts. Metal bonding equipment cannot generally be used for plastics and vice versa. Metals never reach fusion temperatures or achieve a molecular bond, i.e., with metals they do not reach fusion and therefore metal bonding is not a thermoplastic process. With the present invention the ultrasonic tool is adapted to have a cavity therein, and the purpose of the cavity is to provide that fragile parts can be handled. The parts, locked in, vibrate in unison with the horn, whereas in prior devices pressure had to be applied during the vibration. By "remote sealing" is meant sealing at the joints. The present invention does not need pressure and, in addition, the aperture or cavity provides that the parts to be welded will be encompassed so that it will be held in its proper location.

With further reference to the use of thermoplastic materials as used herein, "plastics" is used as a generic term that describes any of various non-metallic compounds that are synthetically produced (usually from organic compounds by polymerization) that can be molded into various forms and hardened for commercial use.

An important aspect or feature is that there is provided a method of holding or clamping the undriven member of the two members being welded, in relation to the member being ultrasonically energized. By "remote sealing" is meant the fusion of plastic joints and wherein the tool is not in intimate contact with the joint. The plastic itself is utilized to conduct the ultrasonic energy to that joint. Only certain materials have the property of transmitting sonic energy.

In addition, the present invention is such that one part of the two to be welded together, is firmly clamped or contained in the ultrasonic horn in such a manner that it is forced to vibrate at the frequency of the horn. In all other methods of ultrasonic welding (both plastic and metal) the horn is applied to the parts under pressure so that there is merely friction coupling between the tool and the part to keep the parts in alignment and contact. In accordance with the present invention shear vibration is used in a unique manner.

The phenomenon of plastic welding differs from that of metal welding by ultrasonics. In plastic welding, actual fusion takes place due to energy release in the resilient material. This does not necessarily occur in metals. Thus, as has been well established, fusion temperatures are not attained in ultrasonic welding, and the action is truly not thermoplastic, as opposed to plastic welding which definitely is.

Minor changes in shape, size and rearrangement of details coming within the field of invention claimed may be resorted to in actual practice, if desired.

What is claimed is:

1. A method of remotely sealing a pair of relatively fragile thermoplastic members directly together at hteir interface, comprising the steps of providing a cavity in an ultrasonic vibratory tool, positioning one of the relatively fragile thermoplastic members in the cavity in the vibratory tool so that at least a portion of the member is completely encompassed by adjacent surfaces of the tool and vibrating the one member back and forth in a direction perpendicular to its main axis, rigidly clamping the second member so that the surface to be welded of the first and second members are in intimate contact, the surface to be welded being parallel to the direction of vibration of the tool, and transferring longitudinal vibrations from the tool through the said one member to shear vibrations at the interface, said vibrations causing acoustical softening at the interface of the two members.

2. A method of remotely sealing fragile thermoplastic materials at their interface whereby fusion of plastic joints is accomplished so that two members are actually bonded together at an interface that is parallel to the direction of vibration of the tool, comprising the steps of clamping one of the two members to be bonded and vibrating it back and forth in a direction perpendicular to its main axis, a portion of said member being completely encompassed, and wherein the one member is used to conduct ultrasonic energy to the joint being clamped having longitudinal vibrations transferred therethrough to shear vibrations at the interface, said vibrations causing acoustical softening at the interface of the two members.

3. In a method of sealing fragile thermoplastic material together at an interface by remote sealing whereby fusion of plastic joints is accomplished at a surface that is parallel to the direction of vibration of the tool, and wherein the plastic itself is used to conduct ultrasonic energy to the joint, so that the two members are actually bonded together, the steps of clamping one of two members to be bonded and vibrating back and forth in a direction perpendicular to its main axis, and transferring longitudinal vibrations through the member being clamped to shear vibrations at the interface, whereby at the interface of the two members there occurs acoustical softening.

4. The method as defined in claim 3, wherein an ultrasonic tool has a cavity in the side thereof.

5. The method as defined in claim 3, wherein the ultrasonic internal seal is produced on one member to seal the same to the second member.

6. The method as defined in claim 3, wherein there is provided a hole in the side of the ultrasonic tool, and wherein the hole extends all the way through said tool.

7. The method as defined in claim 3, wherein there is provided a cavity in the side of the ultrasonic tool, and wherein the cavity extends only partially through the ultrasonic tool.

References Cited
UNITED STATES PATENTS

| 2,724,666 | 11/1955 | Meyers | 156—73 |
| 2,985,954 | 5/1961 | Jones et al. | 156—73 |
| 3,483,611 | 12/1969 | Balamuth et al. | 156—73 |

BENJAMIN A. BORCHELT, Primary Examiner

J. V. DORAMUS, Assistant Examiner